US011938611B2

(12) United States Patent
Wolperding et al.

(10) Patent No.: US 11,938,611 B2
(45) **Date of Patent: *Mar. 26, 2024**

(54) PORTABLE POWER TOOL HAVING AN ELECTROMOTIVE DIRECT DRIVE

(71) Applicant: Robert Bosch GmbH, Stuttgart (DE)

(72) Inventors: Johannes Wolperding, Bernburg (DE); Joachim Schadow, Stuttgart (DE); Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,502

(22) Filed: Nov. 1, 2022

(65) Prior Publication Data

US 2023/0067184 A1 Mar. 2, 2023

Related U.S. Application Data

(60) Division of application No. 16/845,328, filed on Apr. 10, 2020, now Pat. No. 11,518,019, which is a (Continued)

(30) Foreign Application Priority Data

Aug. 9, 2013 (DE) ..................... 10 2013 215 821.1

(51) Int. Cl.
*B25F 5/02* (2006.01)
*B24B 23/02* (2006.01)
*B25F 5/00* (2006.01)

(52) U.S. Cl.
CPC .............. *B25F 5/02* (2013.01); *B24B 23/028* (2013.01); *B25F 5/008* (2013.01)

(58) Field of Classification Search
CPC ........... B25F 5/02; B25F 5/008; B24B 23/028
See application file for complete search history.

(56) References Cited

U.S. PATENT DOCUMENTS 4,991,472 A * 2/1991 Hollingsworth ........ B25B 21/02 81/464
5,392,568 A * 2/1995 Howard, Jr. ............ B24B 23/03 451/344
(Continued)

FOREIGN PATENT DOCUMENTS

CN 1803397 A 7/2006
CN 101088714 A 12/2007
(Continued)

OTHER PUBLICATIONS

International Search Report corresponding to PCT Application No. PCT/EP2014/063099, dated Aug. 13, 2014 (German and English language document) (7 pages).

*Primary Examiner* — Dariush Seif
(74) *Attorney, Agent, or Firm* — Maginot, Moore & Beck LLP

(57) ABSTRACT

A portable power tool includes an electromotive drive with an output shaft defining a first axis and having a first end portion and a second opposite end portion. The first end portion is between a mounted machining tool and the second end portion. The electromotive drive is received in a first power tool housing portion and includes a stator having a first stator end defining a first plane and a second stator end defining a second plane, the first plane is located between the first end portion and the second plane. A second power tool housing portion defines a handle gripping portion with a first surface defining a third plane which intersects the output shaft at a location whereat the first plane is between the third
(Continued)

plane and the second plane. A second surface portion opposite the first surface portion defines a fourth plane parallel to the third plane.

18 Claims, 4 Drawing Sheets

Related U.S. Application Data continuation of application No. 14/911,218, filed as application No. PCT/EP2014/063099 on Jun. 23, 2014, now Pat. No. 10,730,175.

(56) References Cited

U.S. PATENT DOCUMENTS

| | | | | |
|---|---|---|---|---|
| 6,343,982 | B1 * | 2/2002 | Sun | B24B 23/03 451/344 |
| 6,394,884 | B1 * | 5/2002 | Wuensch | B24B 23/03 451/357 |
| 6,454,640 | B1 * | 9/2002 | Siedler | B24B 23/03 451/357 |
| D523,308 | S * | 6/2006 | Corcoran | D8/62 |
| D528,389 | S * | 9/2006 | Wu | D8/62 |
| D538,615 | S * | 3/2007 | Hastie | D8/62 |
| D540,638 | S * | 4/2007 | Concari | D8/62 |
| D544,324 | S * | 6/2007 | Waldron | D8/62 |
| 7,318,768 | B2 * | 1/2008 | Deshpande | B24B 23/03 451/357 |
| 7,770,660 | B2 * | 8/2010 | Schroeder | H02K 5/08 173/171 |
| 7,814,816 | B2 | 10/2010 | Alberti et al. | |
| 8,205,684 | B2 * | 6/2012 | Kokinelis | B25F 5/008 173/171 |
| 8,328,599 | B2 | 12/2012 | Yang | |
| 8,368,276 | B2 * | 2/2013 | Wolf | H02K 15/0442 310/179 |
| D686,478 | S * | 7/2013 | Waldron | D8/62 |
| 8,628,380 | B2 | 1/2014 | Yang | |
| 8,816,544 | B2 | 8/2014 | Tanimoto et al. | |
| 9,079,291 | B2 * | 7/2015 | Ikuta | B24B 23/028 |
| 9,751,186 | B2 | 9/2017 | Sperl et al. | |
| 10,189,140 | B2 * | 1/2019 | Boeck | B25F 5/00 |
| 2002/0151262 | A1 * | 10/2002 | Berger | H02K 5/148 451/358 |
| 2003/0000717 | A1 * | 1/2003 | Hofmann | B27B 5/32 173/216 |
| 2006/0267548 | A1 * | 11/2006 | Uehlein-Proctor | B25F 5/02 320/107 |
| 2006/0276114 | A1 * | 12/2006 | Gallagher | B24B 45/006 451/344 |
| 2007/0256914 | A1 * | 11/2007 | Lohr | B25B 23/18 200/5 A |
| 2008/0090504 | A1 * | 4/2008 | Trautner | H02K 9/06 451/359 |
| 2008/0222871 | A1 * | 9/2008 | Wilkinson | B25F 5/02 29/428 |
| 2009/0213545 | A1 * | 8/2009 | Erb | H01H 9/52 361/700 |
| 2009/0221222 | A1 * | 9/2009 | Lo | B25F 5/008 451/359 |
| 2010/0009608 | A1 * | 1/2010 | Lo | B24B 23/028 451/357 |
| 2010/0123359 | A1 * | 5/2010 | Nishikawa | B25B 21/00 310/58 |
| 2011/0014856 | A1 * | 1/2011 | Yang | F16D 43/21 451/344 |
| 2011/0081846 | A1 * | 4/2011 | Yang | B24B 47/12 451/359 |
| 2011/0081847 | A1 * | 4/2011 | Yang | B24B 47/12 451/548 |
| 2011/0171887 | A1 * | 7/2011 | Tanimoto | H02K 11/33 310/50 |
| 2012/0091839 | A1 * | 4/2012 | Hein | H02K 5/225 310/71 |
| 2012/0129435 | A1 * | 5/2012 | Ikuta | B25F 5/006 451/358 |
| 2012/0207631 | A1 * | 8/2012 | Lehmann | F04D 25/0613 417/423.1 |
| 2012/0241049 | A1 * | 9/2012 | Kato | B25F 5/008 144/136.95 |
| 2012/0292065 | A1 * | 11/2012 | Hoshi | B25B 21/02 173/93 |
| 2012/0292070 | A1 * | 11/2012 | Ito | H02K 11/33 173/217 |
| 2013/0033134 | A1 * | 2/2013 | Naito | B25F 5/008 310/50 |
| 2013/0075121 | A1 * | 3/2013 | Nakamura | B25B 21/02 173/94 |
| 2013/0161046 | A1 * | 6/2013 | Boeck | B25F 5/006 173/170 |
| 2014/0008093 | A1 * | 1/2014 | Patel | H02J 7/00 173/217 |
| 2014/0209341 | A1 * | 7/2014 | Nishikawa | B25F 5/008 173/217 |
| 2014/0242890 | A1 * | 8/2014 | Boeck | B24B 47/12 173/1 |
| 2014/0285971 | A1 * | 9/2014 | Schuele | B24B 23/028 62/3.2 |
| 2014/0370791 | A1 * | 12/2014 | Lutz | B24B 23/028 173/217 |
| 2014/0374130 | A1 * | 12/2014 | Nakamura | B25D 11/00 173/176 |
| 2015/0017892 | A1 * | 1/2015 | Pietzsch | B24B 47/12 451/358 |
| 2015/0083450 | A1 * | 3/2015 | Sperl | B24B 23/03 173/217 |
| 2016/0199958 | A1 * | 7/2016 | Wolperding | B24B 23/028 173/46 |

FOREIGN PATENT DOCUMENTS

| | | | |
|---|---|---|---|
| CN | 102962821 | A | 3/2013 |
| CN | 202985527 | U | 6/2013 |
| DE | 91 04 784 | U1 | 9/1991 |
| DE | 10 2004 027 643 | A1 | 1/2006 |
| DE | 10 2006 023 187 | A1 | 1/2007 |
| DE | 10 2009 027 111 | A1 | 12/2010 |
| DE | 10 2010 032 335 | A1 | 1/2012 |
| WO | 2010/087235 | A1 | 8/2010 |
| WO | 2013/084655 | A1 | 6/2013 |

* cited by examiner

PORTABLE POWER TOOL HAVING AN ELECTROMOTIVE DIRECT DRIVE

This application is a divisional of U.S. application Ser. No. 16/845,328 filed Apr. 10, 2020 which issued Dec. 6, 2022 as U.S. Pat. No. 11,518,019, which is a continuation of U.S. application Ser. No. 14/911,218, filed Feb. 9, 2016, which issued Aug. 4, 2022 as U.S. Pat. No. 10,730,175 and which is a 35 U.S.C. § 371 National Stage Application of PCT/EP2014/063099, filed on Jun. 23, 2014, which claims the benefit of priority to Serial No. DE 10 2013 215 821.1, filed on Aug. 9, 2013 in Germany, the disclosures of which are incorporated herein by reference in their entirety.

The disclosure relates to a portable power tool having an electromotive direct drive.

BACKGROUND

A portable power tool is known from WO2013084655A1.

SUMMARY

The portable power tool according to the disclosure has the advantage of being particularly compact, powerful and, at the same time, ergonomically easy to handle. A first housing of the portable power tool advantageously has a first housing part and a second housing part.

The first housing part and the second housing part are to be understood here to mean, in particular, theoretical constructions that do not exist in practice. This means that the first housing part and the second housing part are not component units that can be mounted and/or demounted. It is also conceivable, however, for the first housing part and the second housing part to be realized as separate component units.

It is proposed that an electromotive drive be accommodated by the first housing part. The second housing part is realized as a handle. The term "handle" is to be understood to mean a component around which the at least one hand of an operator can be laid in order to guide the portable power tool 10.

Advantageously, a ratio of a diameter of the electromotive drive to a diameter of the second housing part is between 0.6 and 1.1, but preferably between 0.7 and 0.8.

The ratio of a length of the portable power tool to a height of the first housing part should be between 1.6 and 2.8, but preferably 2.25. This makes the portable power tool particularly easy to handle.

The height h is to be understood here to mean the geometric dimension of the first housing part in the y direction. The length l of the portable power tool is to be understood to mean the dimension of the portable power tool in the x direction. The length l includes an externally visible length $l_1$ of the rechargeable battery that extends at an upper edge of the portable power tool.

It is proposed to provide at least one rechargeable battery as an energy source for the portable power tool. An energy source is to be understood here to mean a component that provides electrical energy for the electromotive drive.

The features specified in the disclosure render possible advantageous developments of the portable power tool.

It is proposed that the electromotive drive and the first housing together form a first common axis. Advantageously, the first axis is coaxial with the motor shaft.

In an advantageous embodiment, the height h of the first housing is between 70 mm and 90 mm, but preferably 80 mm. The height h in this case is defined along the first axis.

It is proposed that at least one electronics system, for supplying electric current to the electromotive drive, be provided. Advantageously, the electronics system is accommodated, at least partially, by the second housing.

Advantageously, the rechargeable battery and the second housing part together form a second common axis, which goes through the rechargeable battery.

In an advantageous embodiment, the length l of the portable power tool is between 150 mm and 200 mm, but preferably 180 mm. The length l in this case is defined along the second axis. The length l of the portable power tool in this case includes a length $l_1$ of the rechargeable battery. Excluding the length $l_1$ of the rechargeable battery, the length l of the portable power tool is preferably between 130 mm and 170 mm. Particularly preferably, however, the length l of the portable power tool, excluding the length $l_1$ of the rechargeable battery, is 150 mm.

A particularly ergonomic portable power tool is obtained if the ratio of the length l of the portable power tool to a circumference U of the second housing part is between 0.8 and 1.8, in particular between 1.0 and 1.6, but preferably between 1.0 and 1.3.

Advantageously, the circumference U of the second housing part is between 110 and 200 mm, in particular between 125 and 185 mm, but preferably between 150 and 175 mm. The portable power tool is thus ergonomically easy to use with one hand.

Advantageously, the electromotive drive operates as a direct drive. A "direct drive" is to be understood to mean that the electronically commutated motor is connected to a tool spindle without an interposed gearing.

Advantageously, the electromotive drive is an electronically commutated electric motor. It is particularly advantageous if the electronically commutated electric motor is an internal-rotor motor. This makes it possible to achieve high rotational speeds and a high power density. In a further advantageous embodiment, the electronically commutated electric motor is an external-rotor motor. If the electronically commutated electric motor is an external-rotor motor, the electromotive drive is of a robust design and can deliver high torques from standing. Accordingly, such a drive is particularly suitable for applications in which high torques are required.

In a preferred design of the portable power tool, the rotational speed at the tool spindle is greater than 12000 $min^{-1}$.

It is proposed that at least one fan be provided in the first housing. Particularly advantageously, the fan is integrated between the electromotive drive and a receiver for a machining tool. Effective cooling is thus ensured.

Preferably, a weight of the portable power tool is between 0.5 and 1.0 kg. Particularly preferably, the weight of the portable power tool is between 0.6 and 0.7 kg.

In an advantageous embodiment, a machining tool for the portable power tool has a diameter d, which is between 60 and 100 mm, particularly between 70 and 90 mm, but preferably between 75 and 80 mm.

Particularly advantageously, a ratio of the diameter d of the machining tool to the diameter $d_1$ of the electromotive drive is between 1.5 and 2.6, particularly between 1.8 and 2.4, but preferably between 1.9 and 2.1.

Advantageously, a depth of cut of the machining tool is between 20 and 25 mm, preferably between 15 and 20.

In an advantageous embodiment, at least one illumination is provided to illuminate a work area or the like. The illumination device may also project optical information onto the machining tool and/or into the surrounding area.

Data relating to the portable power tool can thereby be communicated to an operator of the portable power tool in a simple and reliable manner.

Further advantages and expedient embodiments are given by the description of the figures and by the drawings.

BRIEF DESCRIPTION OF THE DRAWINGS

Exemplary embodiments of a portable power tool according to the disclosure are shown in the drawings.

There are shown in.

DETAILED DESCRIPTION

Figure 1:
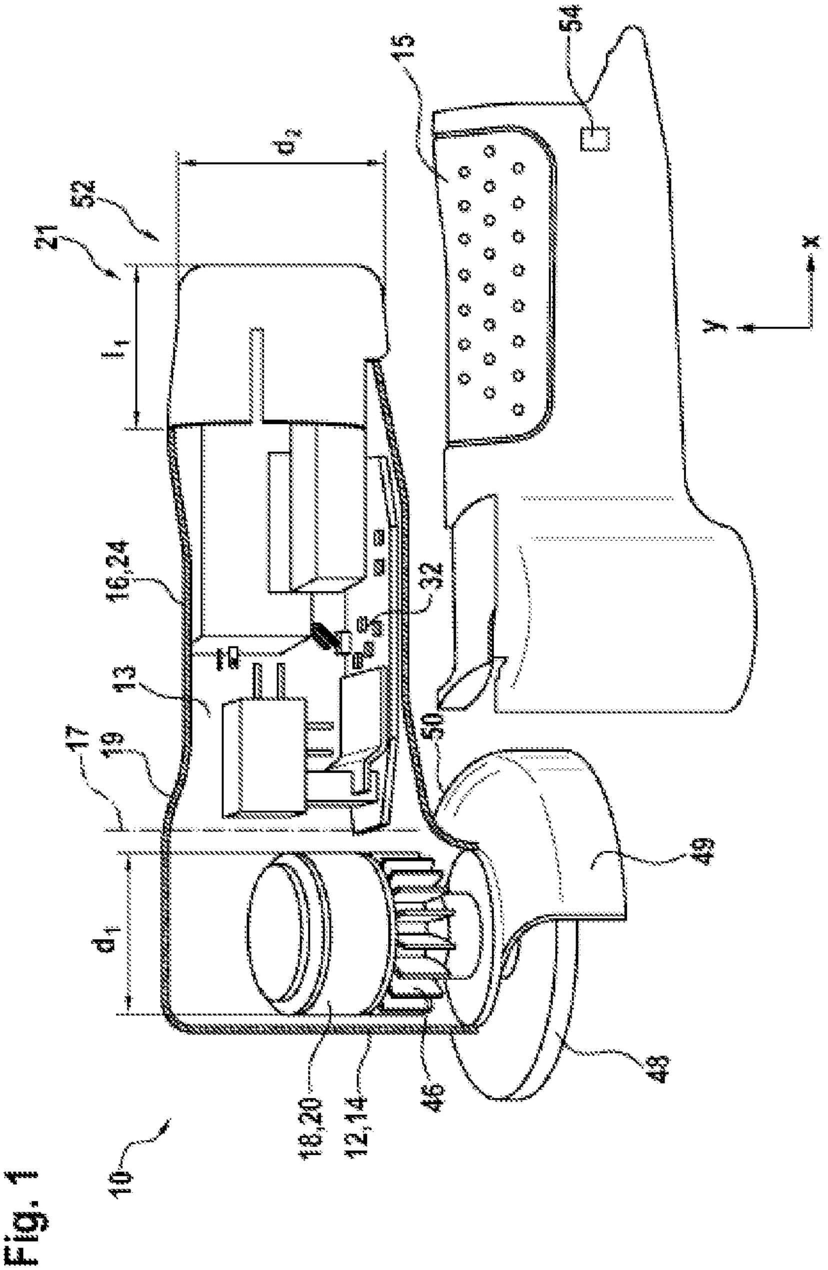
FIG. 1 the portable power tool according to the disclosure, in a schematic representation, FIG. 2 a partial view of the portable power tool according to the disclosure, in a schematic representation, FIG. 3 a second embodiment of the portable power tool according to the disclosure, in a schematic representation, FIG. 4 a third embodiment of the portable power tool according to the disclosure, in a schematic representation.

In the case of the same components occurring in the differing exemplary embodiments, they are denoted by the same reference numerals.

A portable power tool 10, realized as an angle grinder, is shown in a schematic representation in FIG. 1. A first housing 12 consists of a first housing half-shell 13 and a second housing half-shell 15. In this case, a parting plane between the two housing half-shells is located in the image plane of a viewer.

The first housing 12 additionally comprises a first housing part 14 and a second housing part 16. The first housing part 14 and the second housing part 16 are separated by a notional parting line 17. The two housing parts 14, 16 are theoretically represented housing parts, to illustrate the structure of the portable power tool 10. They are not, however, housing parts that can be mounted and/or demounted. The parting line 17 runs vertically in the y direction (see FIG. 1), and crosses an axis of a sleeve-shaped portion 19. In this case, the axis of the sleeve-shaped portion 19 is located in the viewing direction of the viewer.

An electromotive drive 18 is disposed in the first housing part 14. The electromotive drive 18 is preferably realized as an electronically commutated motor 20. The electromotive drive 18 drives a tool spindle 22, not represented in greater detail in FIG. 1. The second housing part 16 is realized as a handle 24. The term "handle" is to be understood to mean a component around which the at least one hand of an operator can be laid, in order to guide the portable power tool 10. A rechargeable battery 26 serves as an energy source for the electromotive drive 18.

A geometric size of the electromotive drive 18 is defined by its diameter $d_1$, which, in the exemplary embodiment, is approximately 38 mm. The value does not take account of any production tolerances occurring in the process of producing the motor. In the preferred design, a ratio of the diameter $d_1$ of the electromotive drive 18 to a diameter $d_2$ of the second housing part 16 is between 0.6 and 1.1. Preferably, the ratio of the diameter $d_1$ of the electromotive drive 18 to the diameter $d_2$ of the second housing part 16 is between 0.7 and 0.8. These specifications do not take account of any deviation that may occur as a result of production tolerances.

Figure 2:
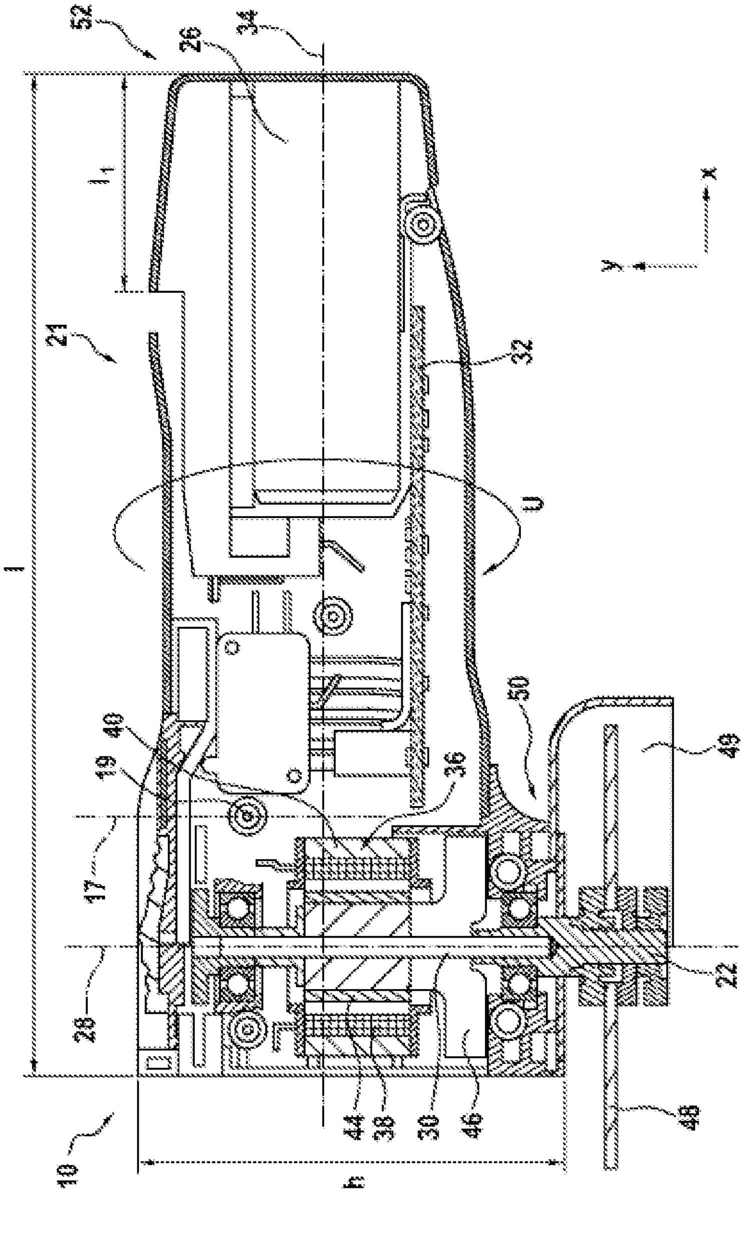

The portable power tool 10 according to the disclosure is shown in partial view, in a schematic representation, in FIG. 2.

As can be seen in FIG. 2, a geometric extent of the first housing part 14 is defined by its height h. The height h in this case is the geometric dimension of the first housing part 14 in they direction.

A geometric extent of the portable power tool is defined by a length l. The length l in this case is the geometric extent of the portable power tool 10 in the x direction. The length l in this case is defined inclusive of an externally visible geometric dimension $l_1$ of the rechargeable battery 26. In this case, the length $l_1$ of the rechargeable battery 26 extends at an upper edge 21 of the portable power tool 10.

As can be seen in FIG. 2, there is an optimum ratio of the length l d of the portable power tool 10 to the height h of the first housing part 14. Optimally, the ratio of the length l of the portable power tool 10 to the height h of the first housing part 14 is between 1.5 and 2.8. Preferably, the ratio of the length l of the portable power tool 10 to the height h of the first housing part 14 is 2.25. These specifications do not take account of any deviations that may occur as a result of production tolerances.

The electromotive drive 18 and the first housing part 14 together form a first common axis 28. The first common axis 28 is coaxial with a motor shaft 30 of the electromotive drive 18. In the exemplary embodiment, the motor shaft 30 continues in the tool spindle 22.

The height h of the first housing part, along the first axis 28, is at least between 70 mm and 100 mm. Preferably, the height h is 80 mm. These specifications do not include possible deviations, which must nevertheless be taken into account, that may result from production tolerances.

An electronics system 32 is provided to supply electric current to the electromotive drive 18. In the exemplary embodiment, the electronics system 32 is disposed in the second housing part. It is also conceivable, however, for the electronics system 32 to be, for example, integrated into the electromotive drive 18 or realized separately.

Furthermore, the electronics system is provided to control the electromotive drive 18 of the portable power tool 10 by open-loop and/or closed-loop control in dependence on a parameter relating to the portable power tool 10.

The rechargeable battery 26 and the second housing part 16 together form a second common axis 34. The second axis in this case goes through the rechargeable battery 26 and extends, advantageously, along the second housing part 16, in an axial direction of the second housing part 16. The length l of the portable power tool 10 is defined along the second axis 34.

The two axes 28, 34 are at an angle a in relation to each other, which angle is between 60° and 120°, particularly between 80° and 100°, but preferably approximately 90°. The angle specification does not take account of any production tolerances.

The length l of the portable power tool 10 along the second axis 34 is at least between 150 mm and 200 mm. Preferably, the length l is 180 mm. The length l of the portable power tool 10 includes a length $l_1$ of the rechargeable battery 26. This specification does not take account of possible production tolerances. Excluding the length $l_1$ of the rechargeable battery 26, the length l of the portable power tool 10 is between 130 mm and 170 mm, but preferably 150 mm.

A further economically good design of the portable power tool 10 is achieved in that the ratio of the length l of the second housing part 16 to the circumference U of the second housing part 16 is designed so as to be optimal. The optimum ratio of the length l of the second housing part 16 to the circumference U of the second housing part 16 should be at least between 0.8 and 1.8, particularly is between 1.0 and 1.6, but preferably between 1.0 and 1.3. The circumference U of the second housing part 16 in this case defines the grip circumference of the handle 24. These specifications do not take account of any deviations that may arise from production tolerances.

A particularly ergonomic design of the portable power tool 10 is achieved by an optimum circumference U of the second housing part 16. In the embodiment according to the disclosure, the grip circumference of the handle 24 is between 110 and 200 mm, particularly between 125 and 185 mm, but preferably between 150 and 175 mm. If the grip circumference of the handle 24 is within this value range, the portable power tool 10 can be guided with one hand in any working position adopted by an operator. These specifications do not take account of any deviations that may arise from production tolerances.

The electronically commutated electric motor 20 drives the tool spindle 22 directly. "Directly" is to be understood to mean that the electronically commutated electric motor 20 is connected to the tool spindle 22 without an interposed conventional gearing.

As can be seen in FIG. 2, the electronically commutated electric motor 20 is an internal-rotor motor. In the case of motors of this type, a stator 36, which carries the current-carrying windings 38, is located on a motor housing 40. A rotor 42, which carries the permanent magnets 44, is connected to the motor shaft 30. The advantages of the internal-rotor motor are a high achievable rotational speed and, at the same time, a high power density.

Figure 3:
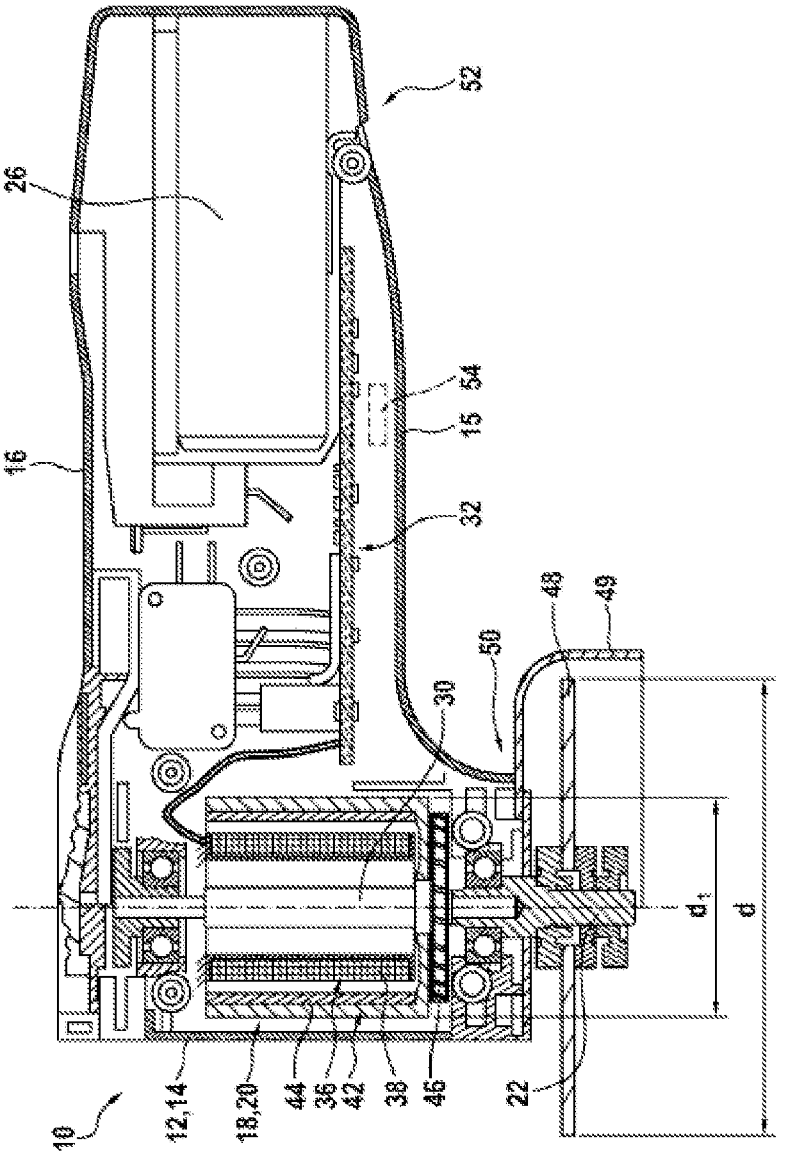

A further embodiment of the portable power tool 10 according to the disclosure is represented in FIG. 3. As can be seen in FIG. 3, the electronically commutated electric motor 20 is an external-rotor motor. In the case of motors of this type, the stator 36, which carries the windings 38, is surrounded by the rotor 42. The magnetic field is generated by permanent magnets 44, which are disposed in the rotor 42. The rotor 42 is usually attached to the motor shaft 30, while the stator is disposed on a stator carrier. Possible advantages of these motors are the high torques that can be achieved.

In the exemplary embodiment, the rotational speed at the tool spindle is at least 12000 $min^{-1}$. The rotational speed may be increased to 20000 $min^{-1}$.

Since, in the case of portable power tools 10 having electronic commutated electric motors 20, the electronics system 32 is more powerful and designed so as to be of a greater size and volume than in the case of brush motors, cooling is increasingly important, and results in the need for optimum cooling. The cooling may be realized actively or passively. In the case of passive cooling, the thermal energy is removed by convection. In the case of active cooling, the thermal energy of the components to be cooled is removed by means of a cooling system.

In the exemplary embodiment, the cooling system is a fan 46. The fan 46 is integrated in the first housing part 14. It is particularly advantageous if the fan 46 is integrated between the electromotive drive 18 and a receiver for a machining tool 48. However, it is also conceivable for other cooling systems to be used, such as Peltier elements, closed cooling circuits or the like.

It is equally conceivable to dispense with the fan, and to realize the cooling, for example, by means of intelligently disposed cooling ribs and/or cooling bodies.

A further advantage of the portable power tool 10 according to the disclosure is the comparatively low weight of the portable power tool 10 in comparison with the weights of portable power tools of this type. The weight of the portable power tool 10 is between 0.5 and 1.0 kg. Preferably, the weight of the portable power tool 10 is between 0.6 and 0.7 kg. The weight includes a weight of the rechargeable battery 26 and a weight of the machining tool 48.

A further advantage of the portable power tool 10 according to the disclosure is that the machining tool 48 is of a small structural size. The machining tool 48 of the portable power tool 10 is, for example, a grinding disc, cutting disc or rough-grinding disc. The machining tool 48 has a diameter d, which is between 60 and 100 mm, but particularly between 70 and 90 mm. Preferably, the diameter d of the machining tool is between 75 and 80 mm. These specifications do not take account of any deviations that may result from production tolerances. Owing to this compact design of the machining tool 48, high rotational speeds of the machining tool 48 can be achieved. If the rotational speed at the tool spindle is, for example, 20000 mind, a machining tool 48 having a diameter d of 80 mm revolves at a speed of approximately 80 m/s.

A further measure of the compactness of the machining tool and the performance of the electromotive drive 18 is a ratio of the diameter d of the machining tool 48 to the diameter $d_1$ of the electromotive drive 18. In the preferred design, the ratio of the diameter d of the machining tool 48 to the diameter $d_1$ of the electromotive drive 18 is between 1.5 and 2.6, but particularly between 1.8 and 2.4. Preferably, the ratio of the diameter d of the machining tool 48 to the diameter $d_1$ of the electromotive drive 18 is between 1.9 and 2.1. These specifications do not take account of any deviations that may result from production tolerances.

The design, according to the disclosure, of the portable power tool 10, electromotive drive 18 and machining tool 48 makes it possible to achieve a depth of cut of the machining tool 48 that is between 20 and 25 mm, but preferably between 15 and 20 mm.

Furthermore, a Protective Hood 49 Covers a Circumferential Region of the Machining Tool 48 in the Radial Direction, and a Radially Extending Face Region 50 of the Portable Power Tool 10.

In the exemplary embodiment, the portable power tool 10 is realized as a battery-operated portable power tool 10. As can be seen from FIG. 1, the rechargeable battery 26 is connected at a rear side 52. The battery voltage is in a range of between 3.6 and 36 v, particularly between 7.2 and 14.4 V, but preferably 10.8 V. The values of the battery voltage do not take account of possible battery voltage fluctuations.

The rechargeable battery 26 is composed, in particular, of lithium-ion battery cells. The rechargeable battery 26 in this case comprises one or more rows of battery cells that, in turn, are connected in parallel to each other. Each individual cell has a length of approximately 65 mm and a diameter of approximately 18 mm. It is also conceivable, however, for a cell to have a length of 65 to 70 mm and a diameter of 14 mm to approximately 20 mm. Lithium-ion batteries are characterized by a high energy density and thermal stability, even in the case of high loads, which means a high power output. A further major advantage is that there is little spontaneous discharge, with the result that the batteries are also ready for use even if not used for relatively long periods. Ensuing from these advantages are the advantages of the application according to the disclosure, in particular that the battery-operated router 10, on the one hand, can be small-dimensioned and compact and, on the other hand, yields high power outputs.

It is also conceivable, however, for the rechargeable battery 26 to be composed of lithium-air cells, of lithium-sulfur cells, lithium-polymer cells or the like. Furthermore, the rechargeable battery 26 may be realized in a geometric design other than that shown, such as, for example, an angular design.

A battery voltage display 54 is integrated in the second housing half-shell 15. The battery voltage display 54 is provided to optically display of a level of the battery voltage. This may be effected by means of colored LEDs, flashing LEDs, digital display elements, LCDs and the like.

Furthermore, a sensor device may be disposed in the second housing part 16, which sensor device detects a damaged and/or incorrectly mounted machining tool and/or jamming of the machining tool and/or rupture of the machining tool during operation of the portable power tool 10.

Furthermore, it is possible, by actuation of a switching element, to activate a blocking device in order to stop the tool spindle 22. The blocking device may be realized as a slide, pin or lever. The stopping of the spindle may be effected by form closure and/or force closure. It is conceivable in this case for elements such as, for example, latching or frictional discs, to be mounted on the output shaft 30. The blocking device may be realized as a separate component. It is also conceivable, however, for the blocking device to be integrated into an existing component or combined with the latter. Such a component may be a switching element, a positioning element or the like. The stopping of the spindle may be effected automatically. It is also conceivable, however, for the stopping of the spindle to be actuated manually.

In one exemplary embodiment, the portable power tool 10 can be operated both in an energy-saving mode and in a boost mode.

Figure 4:
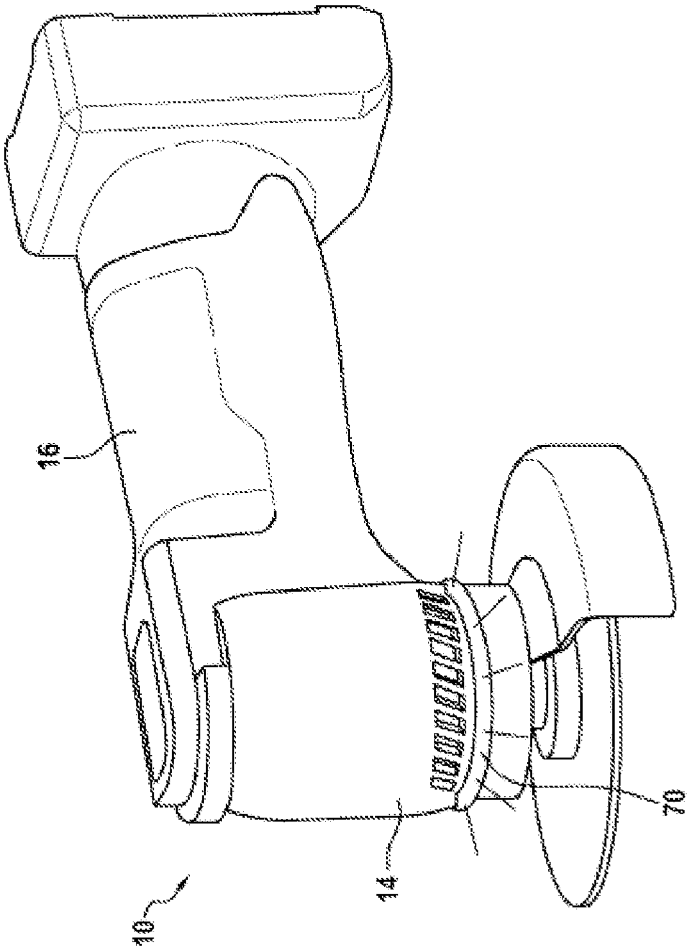

In one exemplary embodiment, in FIG. 4, an illumination device 70 is disposed on the first housing part 14 of the portable power tool 10. However, the illumination device 70 may also be disposed on the second housing part 16. The illumination device 70 may illuminate a work area, but may also project optical information onto a workpiece and/or a surrounding area. The illumination device 70 may both have a single LED and have a plurality of LEDs. The LEDs may be provided in various designs and sizes. However, the illumination device 70 may also be realized as a punctiform light source. It is also conceivable, however, for the illumination device 70 to be realized as a projection device. The illumination device 70 may have illumination elements, which may be disposed, in differing shapes, on the first housing part 14 and/or on the second housing part 16.

The illumination device 70 may be realized as an optical display device. The optical display device may be provided to provide the operator of the portable power tool 10 with a display relating to the parameters of the portable power tool 10. The parameters associated with the portable power tool 10 are, at least, as follows:

- a charge state of the rechargeable battery 26
- an overload state of the portable power tool 10, in particular of the electromotive drive 18, of the electronics system 32 and/or of the rechargeable battery 26
- a rotational speed of the electromotive drive 18
- a current, a voltage and/or a temperature of the electromotive drive 18
- a temperature of the electromotive drive 18 and/or of the electronics system 32

The display of the parameters of the portable power tool 10 may be realized, for example, by the following display possibilities:

- a change in the light color
- a change in the light intensity
- light pulses of differing length
- light pulses of differing brightness
- running light, with change in the run direction of the light
- light pulses, varying in pulse frequency and/or brightness Additionally possible are further displays of the parameters of the portable power tool 10, considered appropriate by persons skilled in the art.

The invention claimed is:

1. A portable power tool, comprising:

an electromotive drive configured to drive an output shaft, the output shaft including a lower first output shaft end and an upper second output shaft end opposite the first output shaft end, the output shaft defining a first axis, the electromotive drive including a stator having a first stator end defining a first plane and a second stator end defining a second plane, the first plane located between the first output shaft end and the second plane and between the first output shaft end and the second end; and a power tool housing that includes a first power tool housing portion configured to receive the electromotive drive, and a second power tool housing portion that defines a handle gripping portion configured to be gripped by a user, the handle gripping portion including a first surface portion defining a third plane, and a second surface portion on a side of the handle gripping portion opposite the first surface portion and defining a fourth plane parallel to the third plane, wherein the output shaft is aligned with an opening in the first power tool housing portion, the third plane intersects the first axis at a first location, the first plane is between the first location and the second plane, and the first plane is between the first location and the fourth plane.

2. The portable power tool of claim 1, wherein the electromotive drive and the first power tool housing portion are coaxial with the output shaft.

3. The portable power tool of claim 2, further including a rechargeable battery, wherein:

the handle gripping portion defines a second axis; and the rechargeable battery and the second power tool housing portion are coaxial with the second axis.

4. The portable power tool of claim 1, further comprising:

at least one electronics system configured to supply electric current to the electromotive drive, the at least one electronics system at least partially received by the second power tool housing portion.

5. The portable power tool of claim 4, wherein the at least one electronics system includes a planar member extending within the handle gripping portion.

6. The portable power tool of claim 1, wherein:

the fourth plane extends through a first portion of the first power tool housing portion; and the third plane extends through a second portion of the first power tool housing portion.

7. The portable power tool of claim 6, wherein:

the first portion of the first power tool housing portion extends upwardly of the second power tool housing portion; and the second portion of the first power tool housing portion extends downwardly of the second power tool housing portion.

8. The portable power tool of claim 1, further comprising:

at least one fan integrated in the first housing portion and mounted on the output shaft, wherein the third plane intersects the at least one fan.

9. The portable power tool of claim 1, wherein:

the first surface portion includes a second location;

the first surface portion includes a third location spaced apart from the second location;

the second location and the third location define the third plane; and when gripped by a user, the second location is contacted by a first finger of the user and the third location is contacted by a second finger of the user.

10. A portable power tool, comprising:

an electromotive drive configured to drive an output shaft, the output shaft including a first output shaft end and a second output shaft end opposite the first output shaft end, the output shaft defining a first axis, the electromotive drive including a stator having a first stator end defining a first plane and a second stator end defining a second plane, the first plane located between the first output shaft end and the second plane and between the first output shaft end and the second end; and a power tool housing that includes a first power tool housing portion configured to receive the electromotive drive, and a second power tool housing portion that defines a handle gripping portion configured to be gripped by a user, the handle gripping portion including a first location and a second location spaced apart from the first location, wherein the output shaft is aligned with an opening in the first power tool housing portion, the first location and the second location define a third plane, when gripped by the user, the first location is contacted by a first finger of the user and the second location is contacted by a second finger of the user, the third plane intersects the output shaft at a third location, and the first plane is between the third location and the second plane.

11. The portable power tool of claim 10, wherein the electromotive drive and the first power tool housing portion are coaxial with the output shaft.

12. The portable power tool of claim 10, the portable power tool further comprising a rechargeable battery, wherein:

the handle gripping portion defines a longitudinal axis; and the rechargeable battery and the second power tool housing portion are coaxial with the longitudinal axis.

13. The portable power tool of claim 10, further comprising:

at least one electronics system configured to supply electric current to the electromotive drive, the at least one electronics system at least partially received by the second power tool housing portion.

14. The portable power tool of claim 13, wherein the at least one electronics system includes a planar member extending within the handle gripping portion.

15. The portable power tool of claim 10, wherein:

the third plane extends through a portion of the first power tool housing portion.

16. The portable power tool of claim 15, wherein:

the portion of the first power tool housing portion extends downwardly of the second power tool housing portion.

17. The portable power tool of claim 10, further comprising:

at least one fan integrated in the first housing portion and mounted on the output shaft, wherein the third plane intersects the at least one fan.

18. A portable power tool, comprising:

an electromotive drive configured to drive an output shaft, the output shaft including a first output shaft end and a second output shaft end opposite the first end, the output shaft defining a first axis, the electromotive drive including a stator having a first stator end defining a first plane and a second stator end defining a second plane, the first plane located between the first output shaft end and the second plane and between the first output shaft end and the second end;

a power tool housing that includes a first power tool housing portion configured to receive the electromotive drive, and a second power tool housing portion that defines a handle gripping portion configured to be gripped by a user, the handle gripping portion including a first location and a second location spaced apart from the first location, wherein the first location and the second location define a third plane, when gripped by the user, the first location is contacted by a first finger of the user and the second location is contacted by a second finger of the user, the third plane intersects the output shaft at a third location, and the first plane is between the third location and the second plane; and at least one fan integrated in the first power tool housing portion and mounted on the output shaft, wherein the third plane intersects the at least one fan.

* * * * *